Patented July 27, 1937

2,088,159

UNITED STATES PATENT OFFICE 2,088,159

METHOD OF MAKING OLEFINE BROMIDES

Ray H. Boundy and Walter E. Roush, Midland, Mich., assignors to The Dow Chemical Company, Midland, Mich., a corporation of Michigan No Drawing. Application May 9, 1935, Serial No. 20,655

5 Claims. (Cl. 260—166)

The invention relates to a method of making an olefine bromide by reacting a vaporizable or gaseous olefine and elementary bromine, in which method the bromine required therefor is contained in a dilute air-bromine mixture such as is obtained in the so called "blowing out" process for extracting bromine from saline solutions.

The usual method of making an olefine bromide is by the direct combination of the olefine and liquid bromine. The raw material from which bromine is extracted commercially consists of natural brines, bitterns or sea water containing soluble bromide in very low concentrations. The usual process of extraction of bromine from such dilute bromide-containing solutions involves treating to liberate elemental bromine, as by chlorinating the solution. The chlorinated solution is then intimately contacted with a voluminous current of air which vaporizes or "blows out" the bromine, the latter being carried away in the air current. The bromine is then removed from the air current by scrubbing the latter with a solution of an alkali, or by adsorption upon active carbon or equivalent adsorbing agent. Liquid bromine is then prepared by acidifying or oxidizing the alkaline liquor, followed by separation of the liquid bromine by distillation and condensation, or by steaming the bromine-saturated carbon to vaporize the bromine, which is then condensed. Either procedure of recovering bromine from the bromine-laden air current involves a number of steps which add to the cost of the liquid bromine and hence increases the cost of olefine bromide prepared therefrom.

One of the objects of the invention is to provide a method of making an olefine bromide whereby the aforesaid bromine-laden air may be utilized directly for making the olefine bromide without first recovering the bromine therefrom in liquid form, thereby eliminating the steps and attendant difficulties of absorbing the bromine vapor from the air-bromine mixture and recovering bromine as a liquid from the absorbent.

We have found that olefines in gas or vapor form, e. g. ethylene, propylene, butylene, etc., can be reacted with bromine to produce a high percentage yield of olefine bromide even though the bromine is diluted with a relatively enormous volume of air or other inert gas, when the mixed gases are contacted with certain catalysts which are capable of promoting the reaction between an olefine and bromine. The reaction produces little or no by-products, and can be carried out at atmospheric or moderately elevated temperatures and pressures. The olefine bromide product is recovered from the gas mixture by adsorption on a suitable medium or by scrubbing with a solvent. The invention, then, consists in the improved method hereinafter fully described and particularly pointed out in the claims.

In carrying our invention into effect, the saline solution containing dissolved bromide is subjected to oxidation to liberate the bromine in elementary form in any manner known to the art, such as by treating with chlorine or by electrolyzing the solution. The solution in which the bromine has been liberated is then treated to separate bromine therefrom, for instance, by blowing out with a blast or current of air in the manner old in the art. The blowing-out operation may be conducted in one or more packed towers in which the bromine solution resulting from the oxidation is contacted with a voluminous current of air. By suitably proportioning the volume of air and the height of the tower to the cross-section thereof and the volume of bromine solution to be handled, the liberated bromine may be substantially completely blown out with air. Normally the ratio of air to bromine vapor in the bromine-laden air stream is of the order of 1300 to 1 by volume.

Such bromine-laden air may also contain a small amount of chlorine, particularly if an excess of chlorine is used to oxidize the saline solution. Such chlorine may be removed by a suitable preliminary treatment of the bromine-laden air to prevent subsequent contamination of the olefine bromide product of the present process. A suitable way of removing chlorine is to contact the air stream with an aqueous solution of an alkali metal or other suitable bromide, for example, sodium bromide. Such operation is conveniently carried out by circulating a solution of sodium bromide over packing in a tower through which the bromine-air mixture is passed.

The bromine-air mixture, substantially free from chlorine, and the olefine gas or vapor are then brought into contact with a catalyst capable of promoting the reaction between bromine and the olefine to form the olefine bromide. Suitable catalysts for the purpose are coke formed from coal and like cokable material, active carbon or charcoal, and the like, in granular form. Such catalysts are also capable of adsorbing bromine and olefine bromides as well as promoting the reaction. In bringing about contact of the bromine-air mixture and the olefine with the catalytic mass, the latter is arranged preferably like packing in a tower type of apparatus and the mixture passed therethrough. In case the olefine is liquid at ordinary temperatures it may be converted to vapor by spraying the liquid olefine into the bromine-laden air or gas stream or otherwise vaporized to produce a mixture of bromine-laden air and olefine in suitable proportions.

As the mixture of gases is passed through the catalytic mass the formation of the olefine bromide occurs, and the latter is absorbed by or adsorbed on the catalyst until saturated. At this point, if desired, the catalyst may be treated with steam to distill out the olefine bromide which is recovered from the aqueous distillate by decantation or otherwise. After so removing the olefine bromide from the catalyst the latter may be reused and the cycle of operations repeated. However, instead of steaming out the catalyst when it becomes saturated, it is preferable to continue to pass the mixture of gases therethrough, since the catalytic mass, even though saturated, will continue to catalyze the reaction and the reaction product will be carried off as vapor from the mass by the gas stream as rapidly as conversion of bromine to olefine bromide occurs. Then by passing the gas stream with its contained olefine bromide vapor into contact with an adsorbent medium for the olefine bromide we have found that the latter can be removed from the diluent gas and recovered from the adsorbent by appropriate treatment. The catalyst then need not be disturbed, as it will function to catalyze the reaction for long periods of time. As adsorbents for olefine bromides active carbon or charcoal, coke, such as gas coke, or like solid materials may be employed. These may be used as packing in a tower so arranged that steam may be passed thereinto periodically to steam out the adsorbed olefine bromide which can be recovered from the condensate in the same manner as from the catalyst, as already described. Solvents may also be used to extract the olefine bromide from the air stream, examples of which are the relatively high boiling hydrocarbon oils, diphenyl oxide, and the like. Such solvents are preferably sprayed through the gas stream carrying the olefine bromide vapor to scrub out the same. The olefine bromide can be recovered from the liquid by distillation.

The yield of olefine bromide obtainable by the hereinbefore described procedure depends upon (1) the ratio of olefine to bromine in the gas stream contacted with the catalyst, (2) the time of contact with the catalyst, (3) the kind of catalyst employed, and (4) the proportion of bromine vapor to diluent gas in the air stream. In the following table data are given showing the results obtained in the application of the method above described to the manufacture of ethylene bromide as an illustrative embodiment of our invention. The data given are based upon bromine vapor diluted with air in the ratio normally obtaining in the blowing-out process referred to, viz., about 1 part of bromine vapor to 1300 parts of air by volume. The percentage yield is calculated to show the proportion of bromine in the bromine-air mixture recovered as ethylene bromide.

Table

| Ratio of $C_2H_4$ to bromine by volume | 2:1 | 1.5:1 |
|---|---|---|
| Time of contact | Per cent yield | |
| 48 sec | 99.0 | 89.0 |
| 16 sec | 96.5 | 85.0 |
| 12 sec | 92.5 | 80.0 |
| 9.6 sec | 85.0 | 72.0 |
| 8 sec | 74.0 | 60.0 |

In the above table data are presented which show the yield when using coked soft coal as a catalyst. With coconut charcoal as the catalyst, equivalent yields can be obtained with a shorter time of contact, for example, with a time of contact of 5 seconds about 80 per cent yield is obtained. Wood charcoal gives about the same degree of conversion as coke for the same time of contact.

Mixtures of olefine bromides can be produced likewise when a mixture of olefines is used. For example, if the gases obtained by cracking kerosene or other similar hydrocarbon mixture that yields olefines on cracking and bromine-laden air be brought into contact with the catalyst, a mixture of olefine bromides is obtained which passes off in the diluent air and can be recovered therefrom as described.

The effectiveness of the catalytic mass is reduced if moisture condenses on it and for this reason the moisture content of the air stream containing the reacting gases should not exceed that at which condensation of water therefrom will occur on the catalytic mass. To prevent such water condensation the air stream may be dried by contact with a hygroscopic solid or solution, such as calcium chloride, or heated above the dew point prior to contact with the catalytic mass.

While we have described our invention more particularly in connection with the recovery of bromine vapor from an air-bromine mixture, we do not wish to be limited to the treatment of such mixtures only, inasmuch as the method may be carried out with any mixture however obtained of bromine vapor and other diluent gases that do not react with bromine or the olefine under the same conditions.

Among the advantages of the invention are that a high yield of olefine bromide, such as ethylene bromide, propylene bromide, etc., may be obtained directly from bromine in a gas mixture containing extremely small amounts thereof without the necessity for recovering such bromine in liquid form prior to reacting with the olefine.

Other modes of applying the principle of our invention may be employed instead of those explained change being made as regards the means and steps herein disclosed provided those stated by the following claims or their equivalent be employed.

We therefore particularly point out and distinctly claim as our invention:—

1. A method of making an olefine bromide which comprises treating a bromine-containing solution to liberate free bromine therein, separating such bromine by blowing out with a current of an inert gas, adding an olefine gas to the bromine-laden gas stream, bringing the mixed gases into contact with a carbon catalyst, whereby olefine bromide is formed as vapor mixed with the inert gas stream, and separating such olefine bromide.

2. A method of making ethylene bromide which comprises treating a bromide-containing solution to liberate free bromine therein, separating such bromine by blowing out with a current of air, adding ethylene to the bromine-laden air stream, bringing the mixed gases into contact with a carbon catalyst, whereby ethylene bromide is formed as vapor mixed with the air stream, and separating such ethylene bromide.

3. A method of making ethylene bromide which comprises treating a bromide-containing solution to liberate free bromine therein, separating such bromine by blowing out with a current of air, adding ethylene to the bromine-laden air stream, bringing the mixed gases into contact with a carbon catalyst, whereby ethylene bromide is formed as vapor mixed with the air stream, and separating such ethylene bromide from the air stream by adsorption upon a porous adsorbent medium therefor.

4. A method of making ethylene bromide which comprises treating a bromide-containing solution to liberate free bromine therein, separating such bromine by blowing out with a current of air, adding ethylene to the bromine-laden air stream, bringing the mixed gases into contact with a carbon catalyst, whereby ethylene bromide is formed as vapor mixed with the air stream, and separating such ethylene bromide from the air stream by adsorption upon active charcoal.

5. A method of making ethylene bromide which comprises treating a bromine-containing solution to liberate free bromine therein, separating such bromine by blowing out with a current of air, adding ethylene to the bromine-laden air stream, bringing the mixed gases into contact with a coke catalyst, whereby ethylene bromide is formed as vapor mixed with the air stream, and separating such ethylene bromide from the air stream by adsorption upon charcoal.

RAY H. BOUNDY.
WALTER E. ROUSH.